US010556199B2

(12) United States Patent
Luchesi De Almeida et al.

(10) Patent No.: US 10,556,199 B2
(45) Date of Patent: Feb. 11, 2020

(54) AIR FILTER

(71) Applicants: Mahle Metal Leve S/A, Jundiai-Sp (BR); Mahle International GmbH, Stuttgart (DE)

(72) Inventors: Alexandre Luchesi De Almeida, Campinas (BR); Edson Valdomiro De Azevedo, Jr., Jundiai-SP (BR); Pedro Basso, Santo Andre-SP (BR); Marcos Jose Dantas De Oliveira, Jr., Santo Andre-SP (BR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/333,763

(22) PCT Filed: Sep. 15, 2016

(86) PCT No.: PCT/EP2016/071881
§ 371 (c)(1),
(2) Date: Mar. 15, 2019

(87) PCT Pub. No.: WO2018/050234
PCT Pub. Date: Mar. 22, 2018

(65) Prior Publication Data
US 2019/0209959 A1 Jul. 11, 2019

(51) Int. Cl.
*B01D 46/00* (2006.01)
*B01D 46/24* (2006.01)

(52) U.S. Cl.
CPC ..... *B01D 46/0046* (2013.01); *B01D 46/0005* (2013.01); *B01D 46/2414* (2013.01); *B01D 2265/021* (2013.01); *B01D 2265/06* (2013.01)

(58) Field of Classification Search
CPC .......... B01D 46/2414; B01D 2265/021; B01D 2265/026; B01D 2265/06; B01D 46/24; B01D 46/0046; B01D 46/0005
See application file for complete search history.

(56) References Cited

U.S. PATENT DOCUMENTS 6,391,073 B1   5/2002   Koga
8,784,523 B2 *  7/2014   Coulonvaux ...... B01D 46/0005
                                                    55/344

(Continued)

FOREIGN PATENT DOCUMENTS

DE    102013014488 A1    3/2015
JP       2000274319 A   10/2000

(Continued)

OTHER PUBLICATIONS

English abstract for JP-2000274319.
English abstract for DE-102013014488.

*Primary Examiner* — Robert Clemente
(74) *Attorney, Agent, or Firm* — Fishman Stewart PLLC

(57) ABSTRACT

An air filter for a fresh-air system of an internal combustion engine may include a filter housing, a filter element, and an inner shroud. The filter element may be arranged in the filter housing and may include an annular filter body, a first end plate, and a second end plate. The inner shroud may be arranged in the filter housing and may be rotatable about a longitudinal center axis of the filter housing. A first torque coupling may be disposed between the first end plate and an end wall of the inner shroud. The first torque coupling may have a driver contour on an inner side of the first end plate and a counterpart driver contour disposed on an outer side of the end wall. The driver contour may be engaged axially in the counterpart driver contour and facilitate torque transmission between the end wall and the first end plate.

19 Claims, 5 Drawing Sheets

(56) References Cited

U.S. PATENT DOCUMENTS

| | | | |
|---|---|---|---|
| 2009/0049814 A1 | 2/2009 | Baseotto et al. | |
| 2009/0217632 A1* | 9/2009 | Coulonvaux | B01D 46/0024 55/359 |
| 2010/0146920 A1* | 6/2010 | Iddings | B01D 46/0001 55/502 |
| 2012/0210683 A1* | 8/2012 | Gillenberg | B01D 46/0024 55/337 |
| 2013/0086877 A1* | 4/2013 | Kori | B01D 46/0024 55/482 |
| 2015/0059304 A1* | 3/2015 | Kaufmann | B01D 46/0005 55/502 |

FOREIGN PATENT DOCUMENTS

| | | | |
|---|---|---|---|
| WO | 2004039476 A1 | 5/2004 | |
| WO | 2017108335 A1 | 6/2017 | |
| WO | 2017108835 A1 | 6/2017 | |

* cited by examiner

AIR FILTER

CROSS-REFERENCE TO RELATED APPLICATION

This application claims priority to International Application PCT/EP2016/071881, filed on Sep. 15, 2016, the contents of which are hereby incorporated by reference in its entirety.

TECHNICAL FIELD

The present invention relates to an air filter or air filter device for a fresh-air system of an internal combustion engine. The invention also relates to a filter element for such an air filter.

BACKGROUND

An air filter of the generic type is known for example from DE 10 2013 014 488 A1. It has a filter housing which has a housing pot, a housing lid, a dirty-air inlet and a clean-air outlet. Arranged in the filter housing is a filter element which has an annular filter body, a first end plate at a first axial end of the filter body, and a second end plate at a second axial end of the filter body. Furthermore, the air filter is equipped with an inner shroud which is arranged in the filter housing, which is a separate component from the filter element and from the filter housing, and which has an annular grating body which is arranged coaxially inside the filter body. In the case of the known air filter, the inner shroud is configured as a supporting tube which is open at a first axial end of the inner shroud and is supported on the first end plate, which is configured as a closed end plate for this purpose. Via its second axial end, the inner shroud is secured to the housing pot in the case of the known air filter.

For a multiplicity of application cases, it may be necessary to rotate the filter element in the filter housing about the longitudinal center axis of the filter housing for installation and for removal. Such rotation may be necessary for example in order to activate or deactivate a lock between the filter element and filter housing. With the lock active, the filter element cannot be extracted from the housing pot. With the lock inactive, by contrast, the filter element can be extracted from the housing pot. Likewise, the lock is not active when the filter element is inserted into the housing pot. Such a lock can in this case expediently cooperate with the second end plate of the filter element, said second end plate leading when the filter element is introduced into the housing pot, i.e. faces a pot bottom of the housing pot. It is likewise possible for the housing lid to be placed on or removed from the housing pot by means of a rotary movement. Conceivable, for example, is a screw closure or a bayonet closure. In this case, the filter element can be rotated together with the housing lid. For example, it may be expedient to latch the housing lid to the first end plate in order to be able to ensure a predetermined rotary position between the filter element and housing lid. Furthermore, it may be conventional to attach a seal, for example in the form of an axial seal and/or in the form of a radial seal, to the second end plate. As soon as this seal is in contact with the housing pot during rotation of the filter element, high friction forces arise there, which counteract the rotary movement.

In the case of comparatively large filter elements, as are used for example in large utility vehicles, in particular in agricultural vehicles and in off-road vehicles, the axial spacing between the two end plates is comparatively large. Only very small torques can be transmitted via the filter body consisting of filter material. However, as soon as significant torque transmission between the two end plates is necessary for example for one of the abovementioned reasons, there is the risk of damage to the filter body. In order to avoid this, it is conventional to integrate the inner shroud into the filter element such that the inner shroud is firmly and permanently connected to the first end plate at its first axial end and is firmly and permanently connected to the second end plate at its second axial end. However, as a result, the filter element is comparatively expensive. Furthermore, there is a problem with regard to material separation when the filter elements are recycled, since the inner shroud is usually produced from a different material than the two end plates and the filter body.

SUMMARY

The present invention deals with the problem of specifying an improved embodiment for an air filter of the generic type, which is distinguished by an inexpensive filter element and in which the risk of damage to the filter element is reduced for the case in which the filter element is rotated in the filter housing about the longitudinal center axis of the filter housing.

This problem is solved according to the invention by the subject matter of the independent claim(s). Advantageous embodiments are the subject matter of the dependent claim(s).

The invention is based on the general idea of arranging the inner shroud in the filter housing so as to be rotatable about the longitudinal center axis of the filter housing. It is furthermore proposed to form a first torque coupling between the first end plate of the filter element and an end wall of the inner shroud that is formed at a first axial end of the inner shroud, said first torque coupling allowing transmission of torques between the filter element and the inner shroud. Thus, when the filter element is rotated, the first torque coupling allows torque transmission to the inner shroud. The inner shroud arranged in a rotatable manner in the filter housing can be entrained via the first torque coupling when the filter element is rotated. If for example a lock of the type mentioned at the beginning is provided, said lock can be activated and deactivated via rotation of the inner shroud. Since the inner shroud is much more stable than the filter body, sufficiently large torques can be applied via the inner shroud in order to be able to effect the desired activation and deactivation of the lock or latch. The same also goes for the abovementioned sealing function when a corresponding seal is arranged on the inner shroud. A further seal between the inner shroud and the filter element is not loaded when the unit composed of the filter element and inner shroud is rotated, since there is no relative movement.

According to an advantageous embodiment, the first torque coupling can have a driver contour, protruding axially in the direction of the second end plate, on an inner side, facing the second end plate, of the first end plate configured as a closed end plate. Furthermore, the first torque coupling can have a counterpart driver contour, complementary to the driver contour, formed on an outer side, facing the first end plate, of the end wall. The driver contour can engage axially in the counterpart driver contour and thus allow torque transmission between the end wall and the first end plate. The driver contour and counterpart driver contour can be realized particularly easily during the production of the first end plate and of the inner shroud, respectively.

Advantageously, the end wall can have a perimeter, i.e. a collar that protrudes axially at the radially outer edge, said collar encircling in a closed manner in the circumferential direction. The counterpart driver contour can be formed by an axial depression formed in the end wall radially within the perimeter. In particular, this depression can be spaced apart radially from the perimeter. As a result of the perimeter, the grating body exhibits a high level of rigidity in the region of the end wall.

In another embodiment, the first end plate has an annular region which is connected to the first axial end of the filter body and which encloses a core region of the first end plate in the circumferential direction. The driver contour is then expediently formed by an axial protrusion formed within the core region. This design can also be realized in a comparatively inexpensive manner. In particular, the first end plate can be an injection molding or a deep drawn part.

In one development, the protrusion can have at least one axial driver protruding axially therefrom. With the aid of the axial driver, the torque transmission within the first torque coupling can be improved.

In another advantageous development, the axial driver has a cutout in which a dome engages axially, said dome being formed in an axial depression complementary to the axial driver and protruding therefrom in the direction of the first end plate. The axial depression is in this case formed in the counterpart driver contour, i.e. on the end wall of the inner shroud. Accordingly, said dome is also located on the end wall. An auxiliary function can be realized via the dome. For example, it is possible to simplify the fitting together of the driver contour and counterpart driver contour via the dome in conjunction with the axial driver when the filter element is placed on the inner shroud. In particular, the dome can effect centering.

In another embodiment, the protrusion has at least one radial driver protruding radially therefrom. Expediently, two diametrically opposite radial drivers can be formed. With the aid of the radial drivers, the torque transmission can be considerably improved even further.

An embodiment in which a second torque coupling for torque transmission between the filter element and the inner shroud is formed between a second axial end of the inner shroud and the second end plate is particularly advantageous. With the aid of this second torque coupling, it is thus possible to transmit torques from the first end plate to the second end plate via the inner shroud, without the filter body being torsionally loaded in the process. This is advantageous in particular when, as mentioned at the beginning, a lock and/or a seal cooperate with the second end plate. For example, such a lock can be activated and deactivated by rotation of the filter element. If the second end plate bears a seal, frictional forces between the seal and the housing pot can be overcome during the rotation of the filter element without the filter body being exposed to a risk of damage as a result.

According to one development, the inner shroud can have an encircling, radially protruding annular collar at a second axial end. Expediently, the second torque coupling cooperates with this annular collar.

In another development, the second torque coupling can have at least one peg which protrudes axially from the annular collar in the direction of the end wall. The second end plate can have at least one peg receptacle complementary to the peg. When the filter element is plugged onto the inner shroud, each peg can now engage axially in its respective peg receptacle and allow the desired torque transmission between the annular collar and the second end plate. In principle, the positioning of the peg and peg receptacle is also reversible, such that at least one peg is formed on the second end plate and protrudes therefrom in the direction of the annular collar and engages in a peg receptacle formed in the annular collar. Mixed configurations are likewise conceivable.

In another embodiment, the filter element is rotatable in the filter housing about the longitudinal center axis of the filter housing between a first rotary position and a second rotary position. The second end plate is unlocked in the first rotary position such that the filter element is axially extractable from and insertable into the housing. The second end plate is locked to the housing pot in the second rotary position such that the filter element is not axially extractable from the housing pot. In this embodiment, a lock that acts between the housing pot and second end plate is activated and deactivated by rotation of the filter element. If the first torque coupling and the second torque coupling are provided, torques which are necessary for activating and deactivating the lock can be applied via the second end plate. Since the force path extends from the first end plate to the second end plate via the inner shroud and thus bypasses the filter body, the filter body is unloaded in this case. If only the first torque coupling is provided, the inner shroud, in particular its annular collar, can also be used to activate and deactivate the lock. Since the inner shroud is rotatable together with the filter element in the filter housing, the torques required for activating and deactivating the lock can also be applied via the inner shroud, or the annular collar thereof. The force path in this case extends from the first end plate into the inner shroud and, here too, bypasses the filter body such that the latter is unloaded.

At its first end plate, a filter element according to the invention has constituent parts of the first torque coupling which, when the filter element has been placed axially on the inner shroud, cooperate with second constituent parts of the first torque coupling for torque transmission between the filter element and inner shroud, such that, when the filter element is rotated, the inner shroud also corotates.

Further important features and advantages of the invention can be gathered from the dependent claims, from the drawings and from the associated description of the figures with reference to the drawings.

It goes without saying that the features mentioned above and those yet to be explained below are usable not only in the combination specified in each case but also in other combinations or on their own without departing from the scope of the present invention.

Preferred exemplary embodiments of the invention are illustrated in the drawings and described in more detail in the following description, wherein identical reference signs relate to identical or similar or functionally similar components.

BRIEF DESCRIPTION OF THE DRAWINGS

In the drawings, in each case schematically.

DETAILED DESCRIPTION

Figure 1:
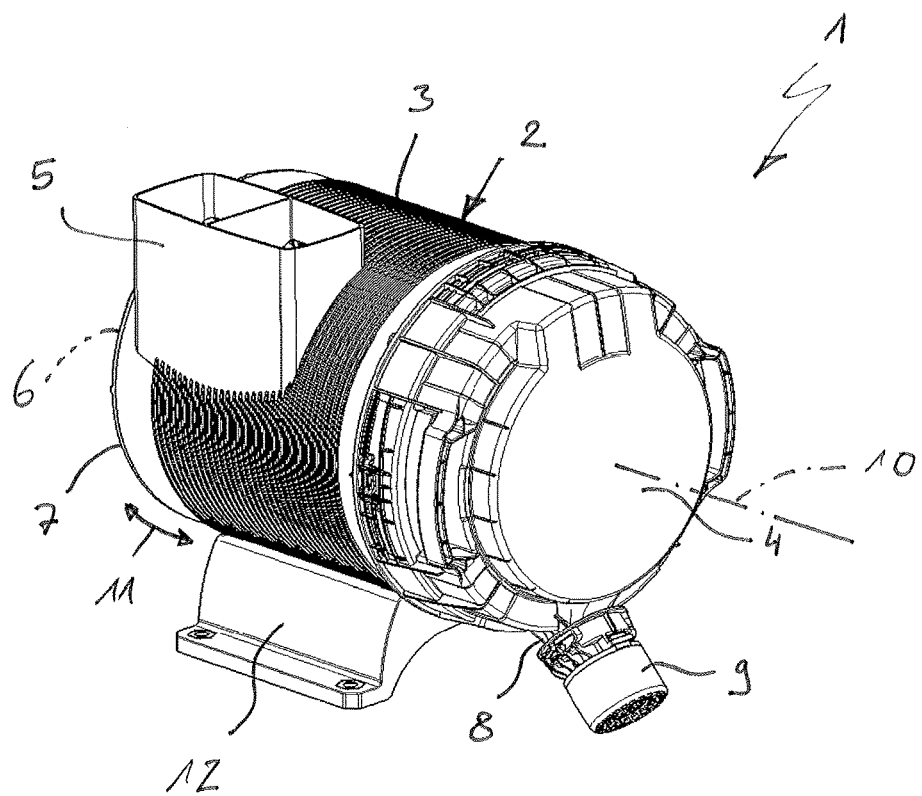
FIG. 1 shows an isometric view of an air filter.

In accordance with FIG. 1, an air filter device 1, or an air filter 1, which serves to filter fresh air in a fresh-air system of an internal combustion engine, comprises a filter housing 2 that has a housing pot 3, a housing lid 4, a dirty-air inlet 5 and a clean-air outlet 6. The clean-air outlet 6 is located in this case on a pot bottom 7 of the housing pot 3 and thus on a side facing away from the observer. Furthermore, the filter housing 2 has a discharge connector 8 to which a discharge valve 9 is attached here.

Figure 2:
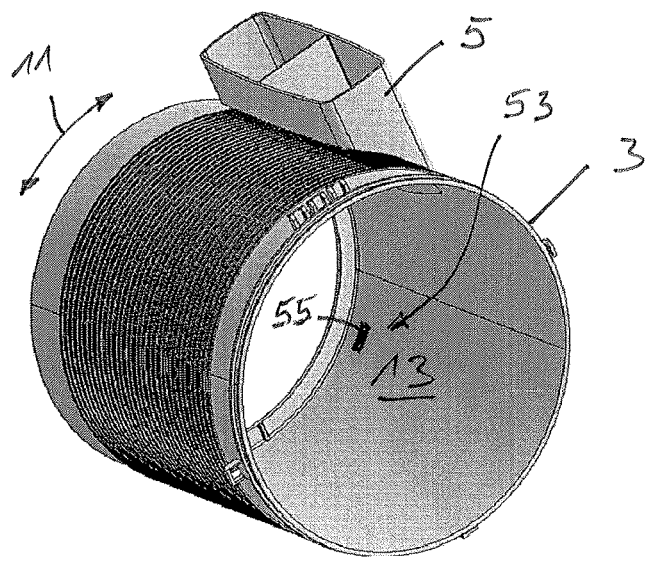
FIG. 2 shows an isometric view of a housing pot of a filter housing of the air filter.

In FIG. 2, only the housing pot 3 having the dirty-air inlet 5 is illustrated, wherein, in FIG. 2, the dirty-air inlet 5 is arranged in a mirror-symmetrical manner with respect to a longitudinal center plane compared with the embodiment in FIG. 1. The longitudinal center plane in this case contains a longitudinal center axis 10 of the filter housing 2, said axis defining the axial direction. The axial direction extends parallel to the longitudinal center axis 10. The radial direction extends perpendicularly to the axial direction. The circumferential direction is indicated by a double arrow denoted 11 and rotates about the longitudinal center axis 10.

In FIG. 2, the pot bottom 7 and the housing lid 4 and also a base 12 have been omitted. Thus, an interior 13 of the filter housing 2, or of the housing pot 3, is discernible. A filter element 14 shown in FIG. 3 and an inner shroud 15 shown in FIG. 4 are also accommodated in the filter housing 2 in this interior 13.

Figure 3:
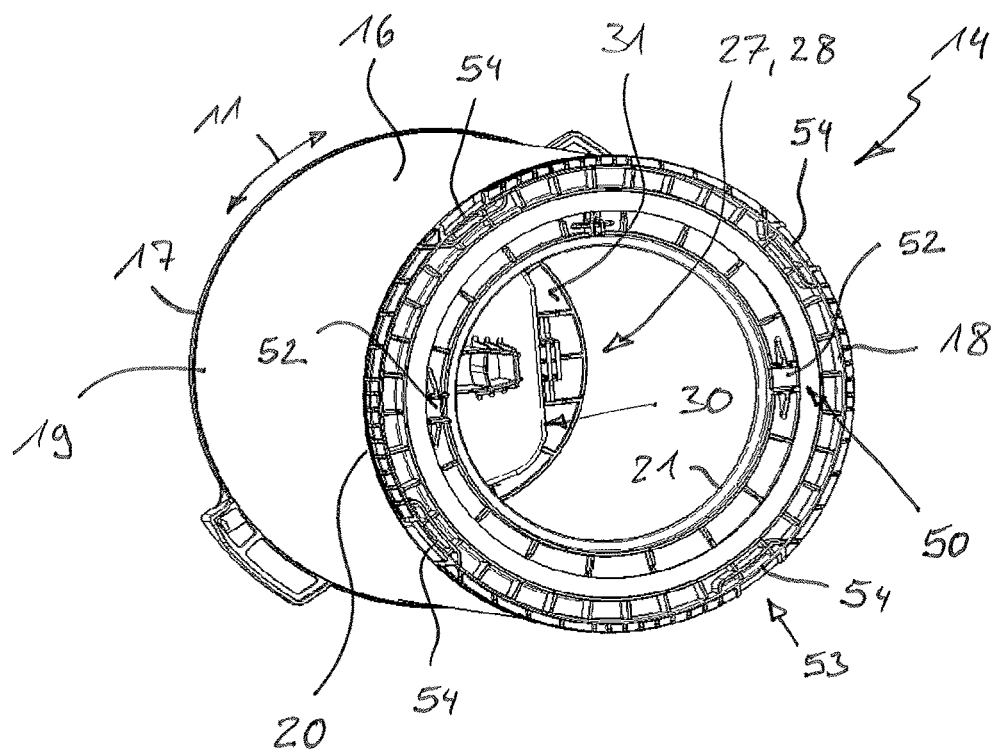
FIG. 3 shows an isometric view of a filter element of the air filter.
Figure 4:
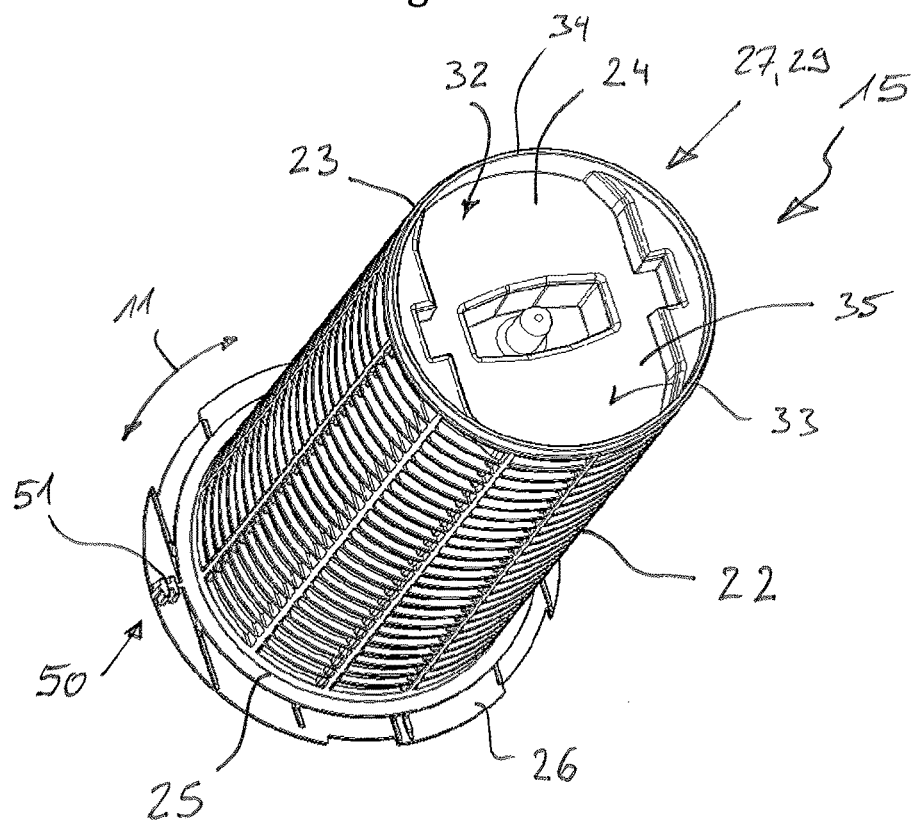
FIG. 4 shows an isometric view of an inner shroud of the air filter.

According to FIG. 3, the filter element 14 has an annular filter body 16 and also a first end plate 17 and a second end plate 18. The first end plate 17 is arranged on the end side at a first axial end 19 of the filter body 16. The second end plate 18 is arranged on the end side at a second axial end 20 of the filter body 16. The second end plate 18, which faces the observer in FIG. 3, is clearly configured as an open end plate which has a central through-opening 21. In contrast thereto, the first end plate 17, which faces away from the observer, is configured as a closed end plate, which accordingly has no such through-opening 21. According to FIG. 4, the inner shroud 15 has an annular grating body 22 and is thus able to have an air flow flowing through it, just like the filter body 16. In the assembled state, the grating body 22 is arranged coaxially inside the filter body 16. It is notable that the inner shroud 15 is a separate component both from the filter housing 2 and from the filter element 14. Furthermore, the inner shroud 15 is arranged so as to be rotatable about the longitudinal center axis 10 in the state installed in the filter housing 2.

At a first axial end 23, the inner shroud 15 has an end wall 24 which is configured here as a closed end wall. At a second axial end 25, the inner shroud 15 is axially open and has an annular collar 26 that protrudes radially outward and extends in the circumferential direction 11. In the installed state, the end wall 24 is located in the region of the first end plate 17, while the annular collar 26 is located in the region of the second end plate 18. Furthermore, the first end plate 17 and the end wall 24 are located in the region of the housing lid 4, while the second end plate 18 and the annular collar 26 are located in the region of the pot bottom 7.

Formed between the first end plate 17 and the end wall 24 is a first torque coupling 27 which allows torque transmission between the filter element 14 and the inner shroud 15. The first torque coupling 17 has, for this purpose, first constituent parts 28 which are formed on the first end plate 17, and second constituent parts 29 which are formed on the end wall 24. In the mounted state, the first constituent parts 28 cooperate with the second constituent parts 29 and form the first torque coupling 27. In the example shown here, the first torque coupling 27 has, or the first constituent parts 28 have, a driver contour 30 which is formed on an inner side 31, facing the second end plate 18, of the first end plate 17 and protrudes axially therefrom in the direction of the second end plate 18. The first torque coupling 27 or the second constituent parts 28 have a counterpart driver contour 32 complementary to the driver contour 30, said counterpart driver contour 32 being formed on an outer side 33, facing the first end plate 17, of the end wall 24. The outer side 33 of the end wall 24 in this case faces away from an interior, enclosed by the grating body 22, of the inner shroud 15. In the mounted state, the driver contour 30 now engages axially in the counterpart driver contour 32 and thus allows the torque transmission between the end wall 24 and the first end plate 17.

Figure 6:
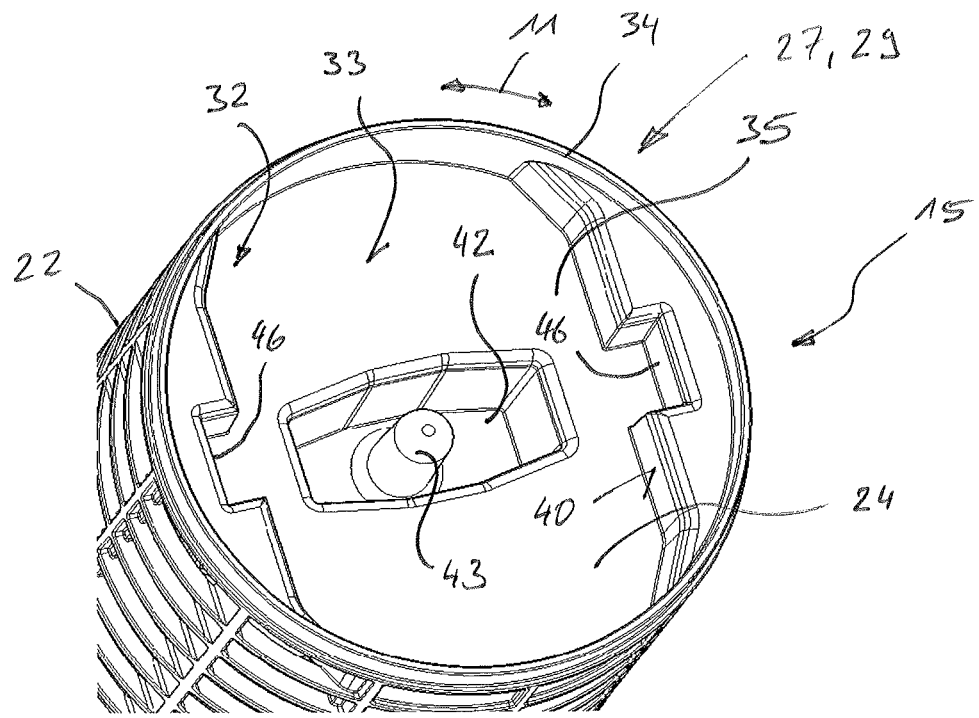
FIG. 6 shows an enlarged view from FIG. 4 in the region of an end wall of the inner shroud.
Figure 7:
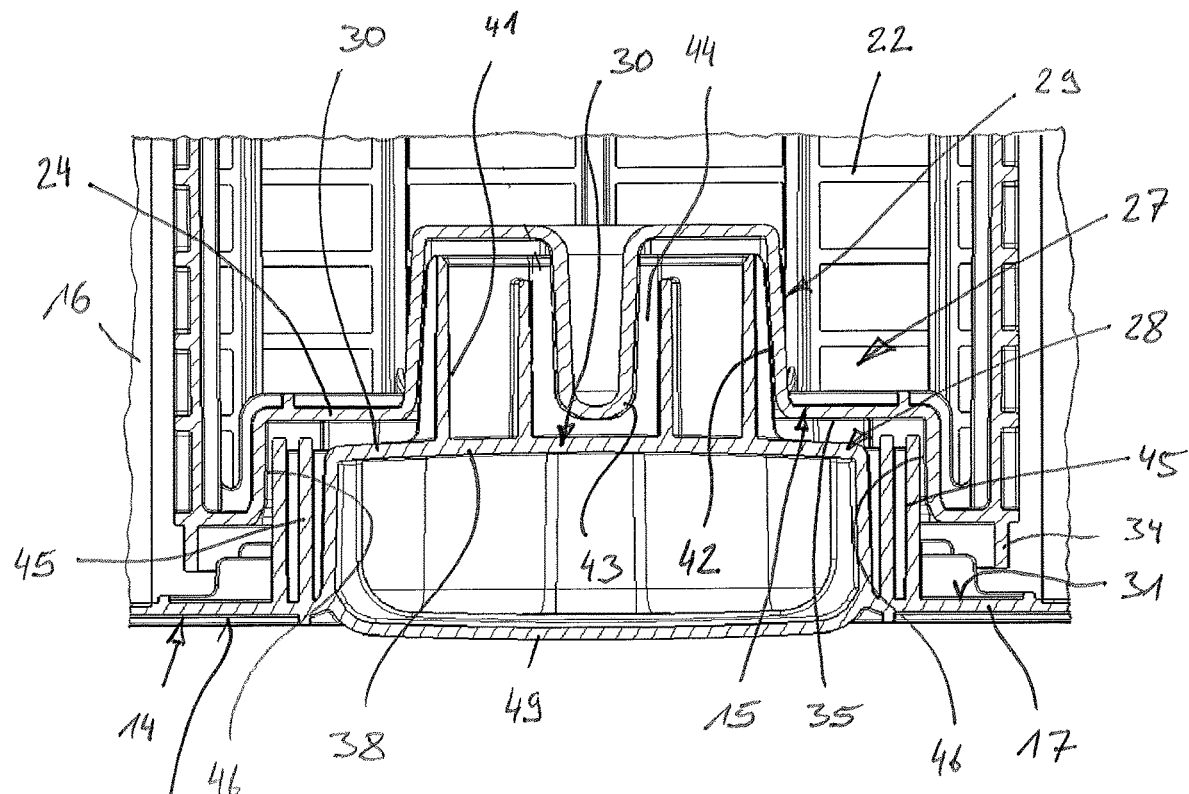
FIG. 7 shows an axial section in the region of a first torque coupling.

According to FIGS. 4, 6 and 7, the end wall has a perimeter 34. The perimeter 34 corresponds in this case to an axially protruding encircling annular collar that is closed in the circumferential direction 11 at the outer periphery of the end wall 24. The counterpart driver contour 32 is formed here by a depression 35 formed in the end wall 24 within the perimeter 34.

Figure 5:
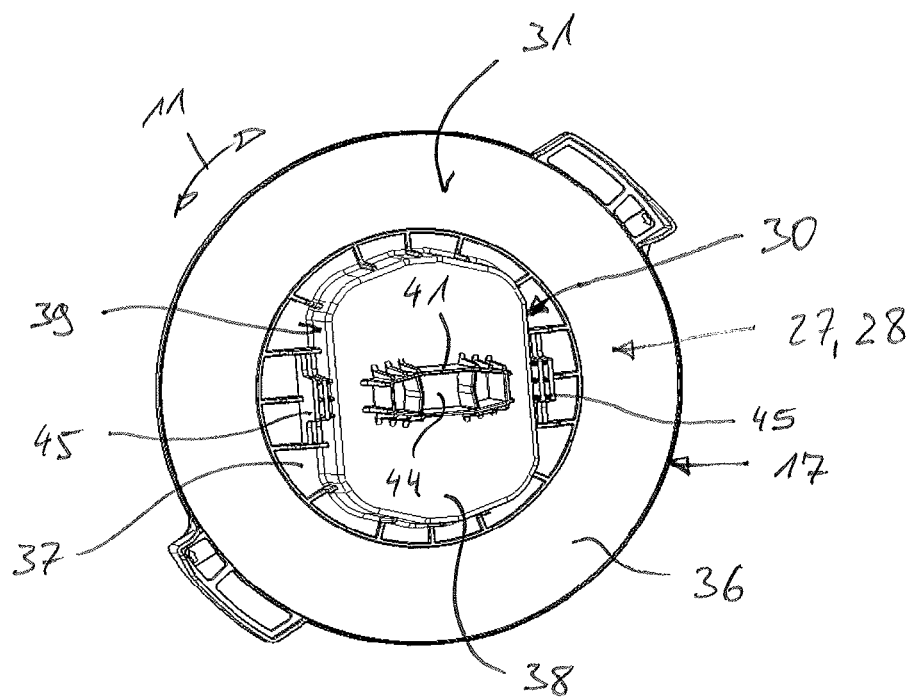
FIG. 5 shows an isometric view from the inside of a first end plate of the filter element.

According to FIGS. 5 and 7, the first end plate 17 has an annular region 36 which is connected to the axial end 19 of the filter body 16. The annular region 36 in this case encloses a core region 37 in the circumferential direction 11. The driver contour 30 is now formed within the core region 37 and in this case formed expediently by a protrusion 38 that protrudes axially in the direction of the second end plate 18. The protrusion 38 is formed in a complementary manner to the depression 35, such that torque transmission takes place by contact between an externally encircling outer contour 39 on the protrusion 38 and an internally encircling inner contour 40 on the depression 35.

In the example shown here, the protrusion 38 has an axial driver 31 protruding axially therefrom. In a complementary manner thereto, the depression 35 has an axial depression 42 recessed axially therein. Furthermore, a dome 43 is formed on the end wall 24 within the axial depression 42, said dome 43 protruding in a manner directed axially away from the interior of the inner shroud 15. In a matching manner thereto, the axial driver 41 has a cutout 44 into which the dome 43 can penetrate axially. Expediently, the dome 43 extends coaxially with the longitudinal center axis 10. Thus, the dome 43 can be used to center the filter element 14 and inner shroud 15. The protrusion 38 furthermore has two radial drivers 45 protruding radially therefrom which are formed diametrically opposite one another on the protrusion 38. The section plane of FIG. 7 extends through the two radial drivers 45 and through the axial driver 41 and the dome 43. In a complementary manner to the radial drivers 45, the depression 35 has corresponding radial depressions 46.

Figure 8:
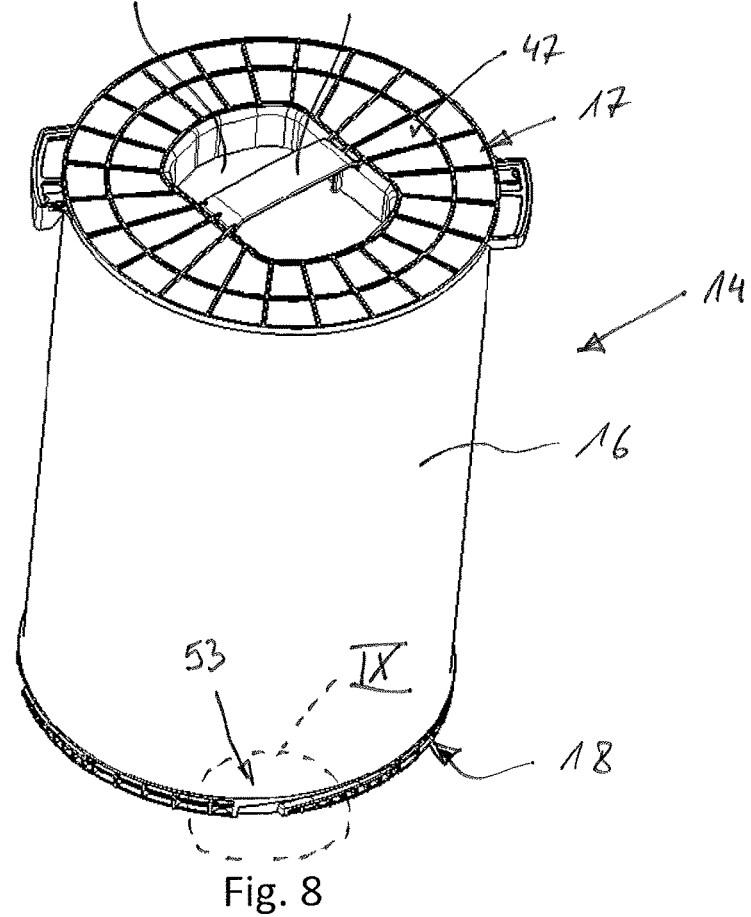
FIG. 8 shows an isometric view of the filter element as in FIG. 3 but in a different viewing direction.

According to FIGS. 7 and 8, the protrusion 30, which is located on the inner side 31 of the first end plate 17, forms a corresponding depression 48 on an outer side 47, facing away from the filter body 16, of the first end plate 17. A handhold 49 can be arranged in the region of this depression 48, it being easy to manipulate the filter element 14 with the aid of said handhold 49. For example, torques can be introduced into the first end plate 17 and thus into the filter element 14 via this handhold 49. These torques are transmitted to the inner shroud 15 via the first torque coupling 27.

According to FIGS. 3 and 4, a second torque coupling 50 can be formed, according to a particularly advantageous embodiment, between the annular collar 26 of the inner shroud 15 and the second end plate 18. This second torque coupling 50 allows torque transmission between the filter element 14 and the inner shroud 15. Thus, a torque, which is introduced into the first end plate 14 for example via the handhold 49, can be transmitted to the inner shroud 15 via the first torque coupling 27 and be transmitted to the second end plate 18 via the second torque coupling 50. In this way, comparatively large torques can be applied to the second end plate 18. A corresponding force path or torque path in this case bypasses the filter body 16, such that the latter is not torsionally loaded.

The second torque coupling 50 can have for example one or more pegs 51 which protrude axially from the annular collar 26 in the direction of the end wall 24. In a complementary manner thereto, the second end plate 50 has a peg receptacle 52 for each peg 51. In the mounted state, each peg 51 engages axially into the associated peg receptacle 52 and thus allows torque transmission between the annular collar 26 and second end plate 18.

Figure 9:
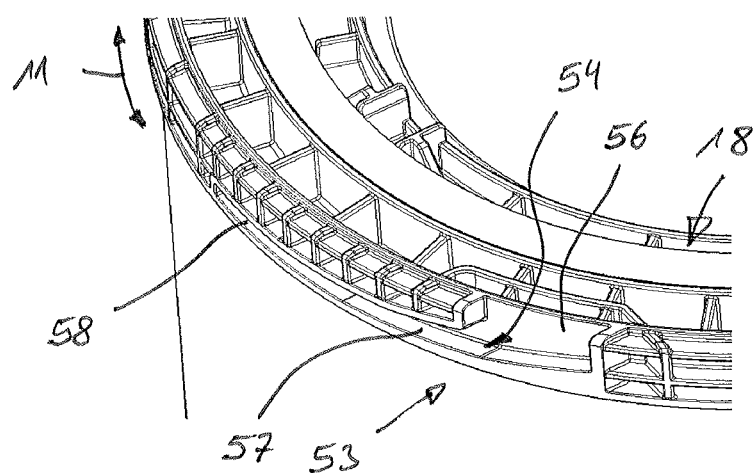
FIG. 9 shows an enlarged detail IX from FIG. 8 but in a different viewing direction.

According to FIGS. 3, 8 and 9, a bayonet closure 53 can be formed between the second end plate 18 and the housing pot 3. The bayonet closure 53 has at least one guide slot 54 on the second end plate 18. Expediently, a plurality of such guide slots 54 are provided in a manner distributed in the circumferential direction 11. In the example in FIG. 3, exactly four such guide slots 54 are provided in a manner distributed regularly in the circumferential direction 11. The bayonet closure 53 furthermore has a lock element 55, formed on the housing pot 3, for each guide slot 54, one of said lock elements 55 being indicated purely by way of example in FIG. 2. The guide contour 54 has an inlet 56 through which the lock element 55 is able to be introduced axially into the guide slot 54. The guide slot 54 furthermore has a ramp 57 which couples a rotary adjustment of the lock element 55 within the guide slot 54 to an axial adjustment such that the ramp 57 defines a screw-action movement. Finally, the guide slot 54 has an end stop 58 into which the lock element 55 is introducible in the circumferential direction 11 and in which the lock element 55 is axially secured. By way of the bayonet closure 53, it is thus possible for the second end plate 18 and thus ultimately the entire filter element 15 to be locked in the filter housing 2. In this case, the filter element 15 can be rotated in the filter housing 2 about the longitudinal center axis 10 between a first rotary position and a second rotary position. In the first rotary position, each particular lock element 55 is oriented so to be aligned axially with the inlet 56 of the associated guide slot 54. Subsequently, the filter element 15 can be axially extracted from or inserted into the housing pot 3 in the first rotary position. Thus, the filter element 14, or the second end plate 18, is unlocked in the first rotary position. In the second rotary position, each particular lock element 55 is located in the end stop 58, such that the filter element 15 cannot be axially extracted from the housing pot 3. Subsequently, the filter element 15, or the second end plate 18, is locked to the housing pot 3 in the second rotary position.

The invention claimed is:

1. An air filter for a fresh-air system of an internal combustion engine, comprising:
   a filter housing including a housing pot, a housing lid, a dirty-air inlet, and a clean-air outlet;
   a filter element arranged in the filter housing including an annular filter body, a first end plate disposed at a first axial end of the filter body, and a second end plate disposed at a second axial end of the filter body;
   an inner shroud arranged in the filter housing, which is a separate component from the filter element and the filter housing, including an annular grating body arranged coaxially inside the filter body;
   the inner shroud arranged on the filter housing such that the inner shroud is rotatable about a longitudinal center axis of the filter housing;
   a first torque coupling for torque transmission between the filter element and the inner shroud provided between the first end plate and an end wall of the inner shroud disposed at a first axial end of the inner shroud;
   the first torque coupling having a driver contour, protruding axially in a direction of the second end plate, on an inner side, facing the second end plate, of the first end plate configured as a closed end plate;
   the first torque coupling having a counterpart driver contour structured complementary to the driver contour provided on an outer side facing the first end plate of the end wall;
   wherein the driver contour is engaged axially in the counterpart driver contour and facilitates torque transmission between the end wall and the first end plate;
   wherein the first end plate has an annular region connected to the first axial end of the filter body which encloses a core region in a circumferential direction relative to the longitudinal center axis, the driver contour is defined by an axially protruding protrusion disposed within the core region, and the protrusion includes at least one axial driver protruding axially therefrom; and
   wherein the at least one axial driver includes a cutout in which a dome is engaged axially, the dome disposed in an axial depression of the end wall structured complementary to the at least one axial driver and protruding therefrom in a direction of the first end plate.

2. The air filter as claimed in claim 1, wherein the protrusion further includes at least one radial driver protruding radially therefrom.

3. The air filter as claimed in claim 1, further comprising a second torque coupling for torque transmission between the filter element and the inner shroud provided between a second axial end of the inner shroud and the second end plate.

4. The air filter as claimed in claim 3, wherein:
   the inner shroud includes an encircling, radially protruding annular collar at the second axial end of the inner shroud;
   the second torque coupling includes at least one peg protruding axially from the annular collar in a direction of the end wall;
   the second end plate includes at least one peg receptacle complementary to the at least one peg; and
   the at least one peg is engaged axially in the at least one peg receptacle and facilitates torque transmission between the annular collar and the second end plate.

5. The air filter as claimed in claim 3, wherein:
   the filter element is rotatable in the filter housing about the longitudinal center axis between a first rotary position and a second rotary position;

the second end plate is unlocked when the filter element is in the first rotary position such that the filter element is axially extractable from and insertable into the housing pot; and the second end plate is locked to the housing pot when the filter element is in the second rotary position such that the filter element is not axially extractable from the housing pot.

6. The air filter as claimed in claim 1, wherein:
the filter element is rotatable in the filter housing about the longitudinal center axis between a first rotary position and a second rotary position;
the second end plate is unlocked when the filter element is in the first rotary position such that the filter element is axially extractable from and insertable into the housing pot; and
the second end plate is locked to the housing pot when the filter element is in the second rotary position such that the filter element is not axially extractable from the housing pot.

7. The air filter as claimed in claim 4, wherein:
the filter element is rotatable in the filter housing about the longitudinal center axis between a first rotary position and a second rotary position;
the second end plate is unlocked when the filter element is in the first rotary position such that the filter element is axially extractable from and insertable into the housing pot; and
the second end plate is locked to the housing pot when the filter element is in the second rotary position such that the filter element is not axially extractable from the housing pot.

8. An air filter for a fresh-air system of an internal combustion engine, comprising:
a filter housing including a housing pot, a housing lid, a dirty-air inlet, and a clean-air outlet;
a filter element arranged in the filter housing including an annular filter body, a first end plate disposed at a first axial end of the filter body, and a second end plate disposed at a second axial end of the filter body;
an inner shroud arranged in the filter housing, which is a separate component from the filter element and the filter housing, including an annular grating body arranged coaxially inside the filter body;
the inner shroud arranged on the filter housing such that the inner shroud is rotatable about a longitudinal center axis of the filter housing;
a first torque coupling for torque transmission between the filter element and the inner shroud provided between the first end plate and an end wall of the inner shroud disposed at a first axial end of the inner shroud;
the first torque coupling having a driver contour, protruding axially in a direction of the second end plate, on an inner side, facing the second end plate, of the first end plate configured as a closed end plate;
the first torque coupling having a counterpart driver contour structured complementary to the driver contour provided on an outer side facing the first end plate of the end wall;
wherein the driver contour is engaged axially in the counterpart driver contour and facilitates torque transmission between the end wall and the first end plate;
wherein the first end plate has an annular region connected to the first axial end of the filter body which encloses a core region in a circumferential direction relative to the longitudinal center axis, the driver contour is defined by an axially protruding protrusion disposed within the core region, and the protrusion includes at least one axial driver protruding axially therefrom;
wherein the at least one axial driver includes a cutout in which a dome is engaged axially, the dome disposed in an axial depression of the end wall structured complementary to the at least one axial driver and protruding therefrom in a direction of the first end plate;
wherein the end wall has a perimeter and the counter driver contour is defined by a depression in the end wall within the perimeter.

9. The air filter as claimed in claim 8, wherein:
the filter element is rotatable in the filter housing about the longitudinal center axis between a first rotary position and a second rotary position;
the second end plate is unlocked when the filter element is in the first rotary position such that the filter element is axially extractable from and insertable into the housing pot; and
the second end plate is locked to the housing pot when the filter element is in the second rotary position such that the filter element is not axially extractable from the housing pot.

10. The air filter as claimed in claim 8, further comprising a second torque coupling for torque transmission between the filter element and the inner shroud provided between a second axial end of the inner shroud and the second end plate.

11. The air filter as claimed in claim 10, wherein:
the inner shroud includes an encircling, radially protruding annular collar at the second axial end of the inner shroud;
the second torque coupling includes at least one peg protruding axially from the annular collar in a direction of the end wall;
the second end plate includes at least one peg receptacle complementary to the at least one peg; and
the at least one peg is engaged axially in the at least one peg receptacle and facilitates torque transmission between the annular collar and the second end plate.

12. The air filter as claimed in claim 11, wherein:
the filter element is rotatable in the filter housing about the longitudinal center axis between a first rotary position and a second rotary position;
the second end plate is unlocked when the filter element is in the first rotary position such that the filter element is axially extractable from and insertable into the housing pot; and
the second end plate is locked to the housing pot when the filter element is in the second rotary position such that the filter element is not axially extractable from the housing pot.

13. The air filter as claimed in claim 10, wherein:
the filter element is rotatable in the filter housing about the longitudinal center axis between a first rotary position and a second rotary position;
the second end plate is unlocked when the filter element is in the first rotary position such that the filter element is axially extractable from and insertable into the housing pot; and
the second end plate is locked to the housing pot when the filter element is in the second rotary position such that the filter element is not axially extractable from the housing pot.

14. An air filter for a fresh-air system of an internal combustion engine, comprising:

a filter housing including a housing pot, a housing lid, a dirty-air inlet, and a clean-air outlet;

a filter element arranged in the filter housing including an annular filter body, a first end plate disposed at a first axial end of the filter body, and a second end plate disposed at a second axial end of the filter body;

an inner shroud arranged in the filter housing, which is a separate component from the filter element and the filter housing, including an annular grating body arranged coaxially inside the filter body;

the inner shroud arranged on the filter housing such that the inner shroud is rotatable about a longitudinal center axis of the filter housing;

a first torque coupling for torque transmission between the filter element and the inner shroud provided between the first end plate and an end wall of the inner shroud disposed at a first axial end of the inner shroud;

the first torque coupling having a driver contour, protruding axially in a direction of the second end plate, on an inner side, facing the second end plate, of the first end plate configured as a closed end plate;

the first torque coupling having a counterpart driver contour structured complementary to the driver contour provided on an outer side facing the first end plate of the end wall;

wherein the driver contour is engaged axially in the counterpart driver contour and facilitates torque transmission between the end wall and the first end plate;

wherein the first end plate has an annular region connected to the first axial end of the filter body which encloses a core region in a circumferential direction relative to the longitudinal center axis, the driver contour is defined by an axially protruding protrusion disposed within the core region, and the protrusion includes at least one axial driver protruding axially therefrom;

wherein the at least one axial driver includes a cutout in which a dome is engaged axially, the dome disposed in an axial depression of the end wall structured complementary to the at least one axial driver and protruding therefrom in a direction of the first end plate;

wherein the end wall has a perimeter, the counter driver contour is defined by a depression in the end wall within the perimeter, and the protrusion further includes at least one radial driver protruding radially therefrom.

15. The air filter as claimed in claim 14, further comprising a second torque coupling for torque transmission between the filter element and the inner shroud provided between a second axial end of the inner shroud and the second end plate.

16. The air filter as claimed in claim 15, wherein:

the inner shroud includes an encircling, radially protruding annular collar at the second axial end of the inner shroud;

the second torque coupling includes at least one peg protruding axially from the annular collar in a direction of the end wall;

the second end plate includes at least one peg receptacle complementary to the at least one peg; and the at least one peg is engaged axially in the at least one peg receptacle and facilitates torque transmission between the annular collar and the second end plate.

17. The air filter as claimed in claim 16, wherein:

the filter element is rotatable in the filter housing about the longitudinal center axis between a first rotary position and a second rotary position;

the second end plate is unlocked when the filter element is in the first rotary position such that the filter element is axially extractable from and insertable into the housing pot; and the second end plate is locked to the housing pot when the filter element is in the second rotary position such that the filter element is not axially extractable from the housing pot.

18. The air filter as claimed in claim 15, wherein:

the filter element is rotatable in the filter housing about the longitudinal center axis between a first rotary position and a second rotary position;

the second end plate is unlocked when the filter element is in the first rotary position such that the filter element is axially extractable from and insertable into the housing pot; and the second end plate is locked to the housing pot when the filter element is in the second rotary position such that the filter element is not axially extractable from the housing pot.

19. The air filter as claimed in claim 14, wherein:

the filter element is rotatable in the filter housing about the longitudinal center axis between a first rotary position and a second rotary position;

the second end plate is unlocked when the filter element is in the first rotary position such that the filter element is axially extractable from and insertable into the housing pot; and the second end plate is locked to the housing pot when the filter element is in the second rotary position such that the filter element is not axially extractable from the housing pot.

* * * * *